(12) United States Patent
Ohta et al.

(10) Patent No.: US 8,392,988 B2
(45) Date of Patent: Mar. 5, 2013

(54) TERMINAL DEVICE AND METHOD FOR CHECKING A SOFTWARE PROGRAM

(75) Inventors: Ken Ohta, Yokohama (JP); Hisashi Oguma, Kawasaki (JP)

(73) Assignee: NTT DoCoMo, Inc., Tokyo (JP)

( * ) Notice: Subject to any disclaimer, the term of this patent is extended or adjusted under 35 U.S.C. 154(b) by 104 days.

(21) Appl. No.: 12/526,513

(22) PCT Filed: Feb. 12, 2008

(86) PCT No.: PCT/JP2008/052276
§ 371 (c)(1),
(2), (4) Date: Oct. 8, 2009

(87) PCT Pub. No.: WO2008/096891
PCT Pub. Date: Aug. 14, 2008

(65) Prior Publication Data
US 2010/0107246 A1     Apr. 29, 2010

(30) Foreign Application Priority Data
Feb. 9, 2007   (JP) .................................. 2007-031380

(51) Int. Cl.
*G06F 21/00* (2006.01)
(52) U.S. Cl. ................. 726/22; 726/23; 726/24; 726/25
(58) Field of Classification Search ........................ None
See application file for complete search history.

(56) References Cited

U.S. PATENT DOCUMENTS

| 6,141,412 A | * | 10/2000 | Smith et al. ............... 379/265.14 |
| 6,141,756 A | | 10/2000 | Bright et al. |
| 6,263,431 B1 | | 7/2001 | Lovelace et al. |
| 6,694,434 B1 | * | 2/2004 | McGee et al. ................. 713/189 |
| 6,711,675 B1 | | 3/2004 | Spiegel et al. |

(Continued)

FOREIGN PATENT DOCUMENTS

| EP | 1 703 430 | 9/2006 |
| JP | 2004 280284 | 10/2004 |

(Continued)

OTHER PUBLICATIONS

Ohta, K. et al., "Trusted Device Framework for Secure Handset Functionality Extension", IPSJ SIG Technical Report, vol. 2005, No. 16, pp. 49-56 (Feb. 23, 2005) (with English Abstract).

(Continued)

*Primary Examiner* — Jung Kim
*Assistant Examiner* — Robert Leung
(74) *Attorney, Agent, or Firm* — Oblon, Spivak, McClelland, Maier & Neustadt, L.L.P.

(57) ABSTRACT

A terminal device according to the present invention includes: a first domain configured to execute multiple software programs; and a second domain configured to operate independently of the first domain and to check whether or not the software programs are safe. The second domain includes: an execution sequence storage unit configured to store execution priority of the multiple software programs to be executed by the first domain; a software program checking unit configured to check whether or not the multiple software programs are safe, according to the execution sequence storage unit; and an execution restricting unit configured to restrict the first domain from executing a software program included in the multiple software programs and having a check result indicating that the software program is unsafe, before checking of all the multiple, software programs is completed.

13 Claims, 9 Drawing Sheets

U.S. PATENT DOCUMENTS

| | | | |
|---|---|---|---|
| 6,775,778 B1 | 8/2004 | Laczko, Sr. et al. | |
| 6,785,808 B2* | 8/2004 | Huntington et al. | 713/2 |
| 6,802,012 B1* | 10/2004 | Smithson et al. | 726/24 |
| 7,028,299 B1* | 4/2006 | Chang | 718/104 |
| 7,103,913 B2* | 9/2006 | Arnold et al. | 726/24 |
| 7,673,343 B1* | 3/2010 | Barton et al. | 726/24 |
| 8,127,358 B1* | 2/2012 | Lee | 726/24 |
| 2003/0074574 A1* | 4/2003 | Hursey et al. | 713/200 |
| 2004/0054998 A1* | 3/2004 | Hayashi | 718/102 |
| 2004/0236960 A1* | 11/2004 | Zimmer et al. | 713/200 |
| 2005/0138270 A1 | 6/2005 | Morais et al. | |
| 2005/0268079 A1* | 12/2005 | Rothman et al. | 713/1 |
| 2006/0015748 A1 | 1/2006 | Goto et al. | |
| 2006/0195847 A1* | 8/2006 | Amano et al. | 718/103 |
| 2006/0288416 A1* | 12/2006 | Costea et al. | 726/24 |
| 2007/0022431 A1* | 1/2007 | Chang | 719/321 |
| 2007/0079377 A1* | 4/2007 | Pagan | 726/24 |
| 2007/0113231 A1* | 5/2007 | Honmura | 718/100 |
| 2008/0141375 A1* | 6/2008 | Amundsen | 726/24 |

FOREIGN PATENT DOCUMENTS

| | | |
|---|---|---|
| JP | 2006 18528 | 1/2006 |
| WO | 00 72149 | 11/2000 |
| WO | 2005 096121 | 10/2005 |

OTHER PUBLICATIONS

Office Action issued May 25, 2011, in Chinese Patent Application No. 200880004575.3 with English translation.

Chinese Office Action issued Apr. 5, 2012, in Patent Application No. 200880004575.3 (with English-language translation).

* cited by examiner

FIG.3

| HASH VALUE | EXECUTION PRIORITY | SOFTWARE PROGRAM ID |
|---|---|---|
| H01 | 1 | X01 |
| H02 | 2 | X02 |
| H03 | 3 | X03 |
| . | . | . |
| . | . | . |
| . | . | . |
| H0n | n | XXX |
| HA1 | — | A01 |
| HB2 | — | B02 |
| HC3 | — | C03 |
| . | . | . |
| . | . | . |
| . | . | . |

Rows H01–H0n: FIRST SOFTWARE PROGRAM
Rows HA1 onward: SECOND SOFTWARE PROGRAM

FIG.4

| SOFTWARE PROGRAM ID | EXECUTION FREQUENCY |
|---|---|
| A01 | 10 |
| B02 | 8 |
| C03 | 6 |
| . | . |
| . | . |
| . | . |

FIG. 7

| HASH VALUE | SOFTWARE PROGRAM ID | EXECUTION PRIORITY | EXECUTING STATE | | NON-EXECUTING STATE | |
|---|---|---|---|---|---|---|
| | | | INSTRUCTION INFORMATION FOR CONTROLLABLE STATE | INSTRUCTION INFORMATION FOR UNCONTROLLABLE STATE | INSTRUCTION INFORMATION FOR CONTROLLABLE STATE | INSTRUCTION INFORMATION FOR UNCONTROLLABLE STATE |
| H01 | X01 | 1 | EXECUTION STOP | RESET | DELETE | RESET |
| H02 | X02 | 2 | EXECUTION STOP, DELETE | RESET | EXECUTION PROHIBITION | RESET |
| H03 | X03 | 3 | EXECUTION STOP | RESET | DELETE | DO NOTHING |
| ... | ... | ... | ... | ... | ... | ... |
| H0n | XXX | n | EXECUTION STOP | RESET | EXECUTION PROHIBITION | DO NOTHING |
| HA1 | A01 | — | EXECUTION STOP | DO NOTHING | DELETE | RESET |
| HB2 | B02 | — | EXECUTION STOP | DELETE | EXECUTION PROHIBITION | DELETE |
| HC3 | C03 | — | DO NOTHING | RESET | EXECUTION PROHIBITION | DELETE |
| ... | ... | ... | ... | ... | ... | ... |

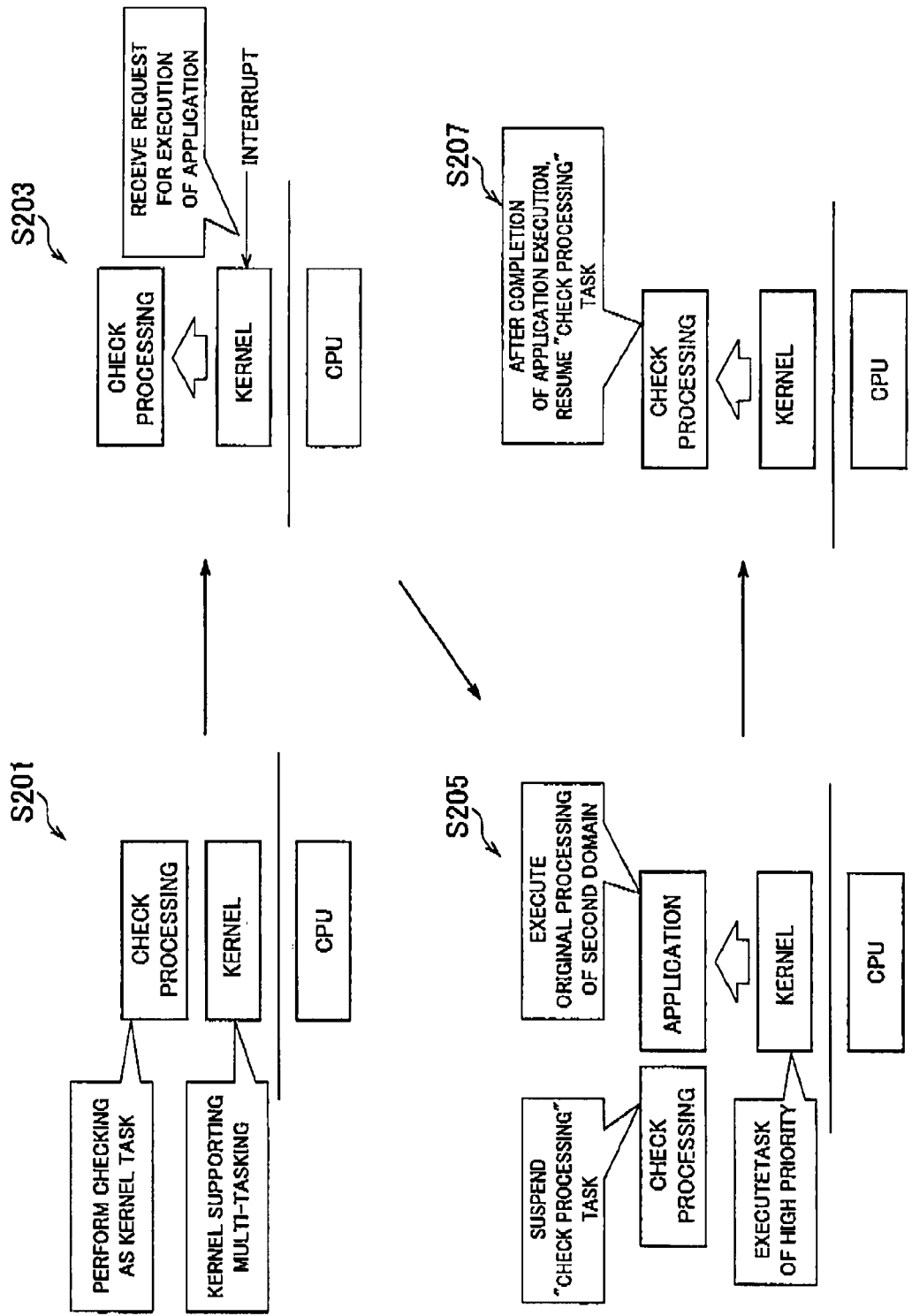

FIG.9

| HASH VALUE | SOFTWARE PROGRAM ID |
|---|---|
| H01 | 1 |
| H02 | 2 |
| H03 | 3 |
| ... | ... |
| H0N | n |

FIG.10

| HASH VALUE | SOFTWARE PROGRAM ID | DOMAIN ID |
|---|---|---|
| H01 | 1 | 1 |
| H02 | 2 | 2 |
| H03 | 3 | 2 |
| ... | ... | ... |
| H0N | n | 2 |

FIG.11

| HASH VALUE | SOFTWARE PROGRAM ID | DOMAIN ID | TIMING INFORMATION |
|---|---|---|---|
| H01 | 1 | 1 | AT STARTUP |
| H02 | 2 | 2 | BOTH |
| H03 | 3 | 2 | BOTH |
| . | . | . | . |
| . | . | . | . |
| . | . | . | . |
| H0N | n | 2 | AFTER COMPLETION OF STARTUP |

TERMINAL DEVICE AND METHOD FOR CHECKING A SOFTWARE PROGRAM

TECHNICAL FIELD

The present invention relates to a terminal device including a first domain that executes a software program and a second domain that checks whether or not the software program is safe, and a method for checking software program.

BACKGROUND ART

For a terminal device such as a mobile phone, a PDA (personal digital assistant), or a PC, there has heretofore been a concern that a software program therein such as an operating system (hereinafter referred to as OS) or an application software program is tampered by attackers, thereby causing a deterioration of safety. Hence, in recent years, in order to ensure security of such a terminal device, various techniques for checking whether or not the software program is safe have been proposed (see Patent Document 1, for example).

Patent Document 1 discloses a technique for performing checking of a software program by using multiple processors. In the technique disclosed in Patent Document 1, in a device including a main processor for executing a basic software program to be used in the device and a secure processor isolated from the main processor, the secure processor checks a software program to be executed by the main processor. In the secure processor, a key to be used in cryptography processing and decoding processing is stored in such a way that an access to the key from the outside is denied. The secure processor checks whether or not a software program to be executed by the main processor is safe, according to whether or not the software program is successfully decoded by using the key. In addition, the secure processor ensures security of a software program to be executed by the main processor, by checking the software program every time the software program is loaded from a secondary memory to a main memory and is stored.

Patent Document 1: Japanese Patent Application Publication No. 2006-18528

DISCLOSURE OF THE INVENTION

However, in the technique disclosed in the Patent Document 1, a software program, such as an OS or an application, is checked when the software program is started (loaded), and the software program is ready to use after the checking is completed. Thus, there is a problem of inconvenience to the user, such as increased startup, time of a terminal device which executes an OS and an application in sequence upon booting, and degraded responsive time of invoking an application by the user. Furthermore, capacity of a software program to be used in a mobile phone, a PC and the like has continued to increase in recent years, and accordingly, check time of a software program has also increased. Hence, measures to reduce check time and conceal check time from the user, for example, are needed.

Hence, the present invention has been made in light of the problems described above, and an object of the present invention is to provide a terminal device configured to reduce an increase in a startup time of an OS or an application due to checking of a software program, while preventing security degradation, and to provide a method for checking a software program.

In order to achieve the object described above, a first aspect of the present invention is summarized as a terminal device (terminal device 1) including: a first domain (first domain 10) configured to execute a plurality of software programs; and a second domain (second domain 20) configured to operate independently of the first domain and to check whether or not each of the plurality of software programs is safe, wherein the second domain includes: an execution sequence storage unit (execution sequence storage unit 111) configured to store execution priority of the plurality of software programs to be executed by the first domain; a software program checking unit (software program checking unit 117) configured to check whether or not the plurality of software programs are safe, according to the execution priority stored in the execution sequence storage unit; and an execution restricting unit (execution restricting unit 123) configured to restrict the first domain from executing a software program included in the plurality of software programs and having a check result indicating that the software program is unsafe, before checking of all the plurality of software programs is completed.

According to the aspect, in the terminal device, since the software program checking unit of the second domain can independently check software programs in sequence without depending on processing by the first domain, check time of a software program can be reduced. In addition, since the first domain does not perform a checking process when the first domain executes such a software program as an application, middleware, an OS, or a device driver, overhead in the check time can be hidden from the user. In addition, since the execution restricting unit of the second domain restricts execution of a software program by the first domain before checking of all the multiple software programs is completed, security can be ensured even when the first domain executes a software program before the entire checking is completed.

According to the aspect, while ensuring security by checking a software program, the terminal device can reduce an increase in a startup time of an OS or an application due to the checking.

A second aspect of the present invention according to the first aspect is summarized in that: the execution sequence storage unit is configured to store each of the plurality of software programs in association with any one of first domain identification information that identifies the first domain and second domain identification information that identifies the second domain; according to the execution priority, the software program checking unit of the second domain is configured to check whether or not each software program stored in association with the second domain identification information is safe; and the first domain includes a sub software program checking unit (sub software program checking unit 200) configured to check whether or not each software program stored in association with the first domain identification information is safe.

According to the aspect, checking processes can be shared, by, for example, leaving, to the first or other domain, any software program which cannot be checked due to restrictions of hardware or software program in the second domain, and the like. In addition, processing efficiency of the entire terminal device can be improved by distributing loads of the checking processes.

A third aspect of the present invention according to the first or second aspect is summarized in that: the execution sequence storage unit is configured to store each of the plurality of software programs in association with timing information indicating at least one of timing at startup of the terminal device and timing after completion of startup of the terminal device; and each of the software program checking unit and the sub software program checking unit is configured to check whether or not the software program is safe, according to the timing indicated by the timing information.

According to the aspect, safety can be ensured because software program can be checked at startup of the first domain, the software program being software program whose check cannot be completed before execution by the first domain due to restrictions of performance of a checking process, check start timing or the like of the second domain. That is, the first domain can be prevented from executing software program before checking of the software program is completed.

A fourth aspect of the present invention according to any one of the first to third aspects is summarized in that: the second domain further includes a safe software program list (safe software program list 119) that stores identification information of a software program included in the plurality of software programs and determined to be safe by the software program checking unit; and the first domain is configured to judge whether or not identification information of a certain software program is stored in the safe software program list, before executing the certain software program, and to restrict (block) execution of the certain software program when the identification information of, the certain software program is not stored in the safe software program list.

According to the aspect, the first domain can be prevented from executing software program before checking of the software program is completed.

A fifth aspect of the present invention according to any of the first to fourth aspects is summarized in that: the plurality of software, programs includes a first software program to be constantly executed by the first domain and a second software program to be executed with predetermined frequency by the first domain; the execution sequence storage unit is configured to preferentially store the execution priority of the first software program rather than the execution priority of the second software program; and according to the execution priority, the software program checking unit is configured to preferentially check the first software program rather than the second software program as to whether or not the software program is safe.

A sixth aspect of the present invention according to the fifth aspect is summarized in that: the second domain further includes, an execution frequency acquiring unit (execution frequency acquiring unit 113) configured to acquire execution frequency of the second software program to be executed by the first domain, and an execution frequency storage unit (execution frequency storage unit 115) configured to store the second software program in association with the acquired execution frequency; and the software program checking unit is configured to check whether or not the second software program is safe, by using, as the execution priority, the execution frequency stored in the execution frequency storage unit.

A seventh aspect of the present invention according to any one of the first to sixth aspects is summarized in that the second domain further includes an unsafe software program list (unsafe software program list 121) configured to store identification information of a software program included in the plurality of software programs and determined to be unsafe by the software program checking unit.

An eighth aspect of the present invention according to any one of the first and seventh aspects is summarized in that the software program checking unit is configured to check whether or not the plurality of software programs are safe, every predetermined period.

A ninth aspect of the present invention according to the seventh aspect is summarized in that: the first domain is configured to transmit result request information requesting a check result of a software program already checked among the plurality of software programs; the second domain further includes a result notifying unit (result notifying unit 217) configured to transmit result response information to the first domain upon receipt of the result request information from the first domain, the result response information including the identification information stored in the safe software program list and the identification information stored in the unsafe software program list; and the first domain is configured to execute only a software program determined to be safe by the software program checking unit, on the basis of the result response information received from the result notifying unit.

A tenth aspect of the present invention according to the ninth aspect is summarized in that: the second domain further includes a request receiver unit (request receiver unit 131) configured to receive check request information requesting a check of the software programs, from the first domain; when the result response information notified of from the result notifying unit does not include identification information of a specific software program whose execution is to be now started, the first domain is configured to transmit the check request information requesting a check of the specific software program, to the request receiver unit; if the software program checking unit is checking another software program different from the specific software program when the request receiver unit receives the check request information, the request receiver unit is configured to suspend the checking of the different software program; and the software program checking unit is configured to give priority to the specific software program and to check whether or not the specific software program is safe.

An eleventh aspect of the present invention according to the tenth aspect is summarized in that: when the first domain transmits the check request information, the first domain is configured to suspend execution of the specific software program until the first domain receives an instruction from the execution restricting unit; and the execution restricting unit is configured to instruct the first domain to execute the specific software program when the software program checking unit determines that the specific software program is safe.

A twelfth aspect of the present invention according to the tenth aspect is summarized in that: the first domain is configured to start execution of the specific software program when the first domain transmits the check request information to the request receiver unit; and the execution restricting unit is configured to restrict the first domain from executing the specific software program, when the software program checking unit determines that the specific software program is unsafe.

A thirteenth aspect of the present invention according to the first aspect is summarized in that the execution restricting unit is configured to restrict the first domain from executing the plurality of software programs, until the software program checking unit completes checking of whether or not the plurality of software programs are safe.

A fourteenth aspect of the present invention is summarized as a method for checking a software program in a terminal device including a first domain configured to execute a plurality of software programs and a second domain configured to check whether or not each of the plurality of software programs is safe, the method including: a sequence storing step of storing, at the second domain, execution priority of the plurality of software programs to be executed by the first domain; a checking step of checking, at the second domain, whether or not the plurality of software programs are safe, according to the execution priority; and a restricting step of restricting, at the second domain, the first domain from executing a software program included in the plurality of software programs and having a check result indicating that the software program is unsafe.

As described above, according to the present invention, it is possible to provide a terminal device and a method of checking software program that are capable of reducing an increase in a startup time of an OS or an application due to checking of software program, while suppressing security degradation.

BRIEF DESCRIPTION OF THE DRAWINGS

FIG. 3 shows information to be stored in an execution sequence storage unit according to the first embodiment.

FIG. 4 shows information to be stored in an execution frequency storage unit according to the first embodiment.

FIG. 7 shows information to be stored in an execution sequence storage unit according to a second embodiment.

FIG. 8 is a diagram showing an image of transition of the processing state of the second domain in a third embodiment.

FIG. 9 shows one example of information to be stored in the execution sequence storage unit according to the first embodiment.

FIG. 10 shows another example of information to be stored in the execution sequence storage unit according to the first embodiment.

FIG. 11 shows yet another example of information to be stored in the execution sequence storage unit according to the first embodiment.

BEST MODES FOR CARRYING OUT TEE INVENTION

Figure 1:
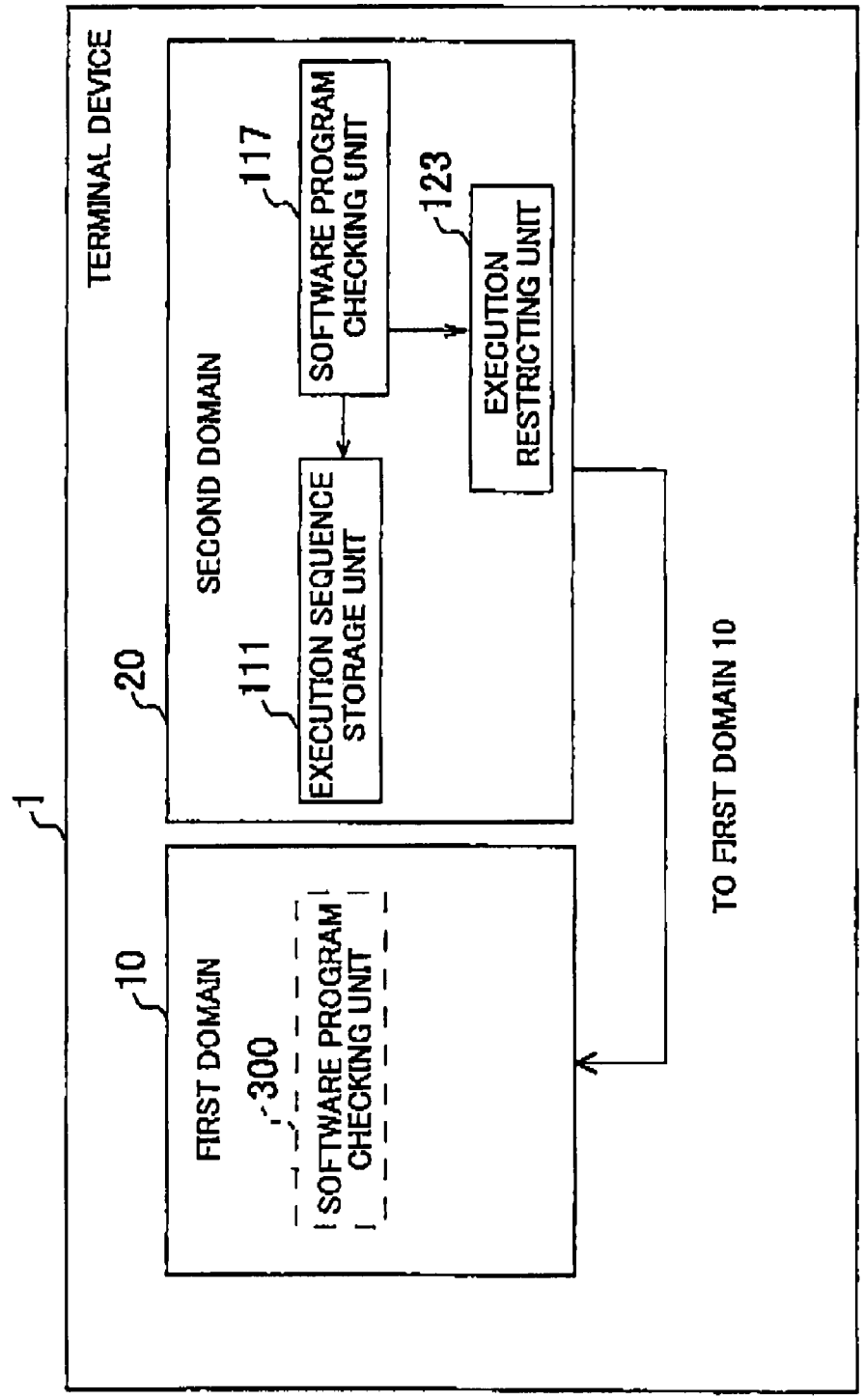
FIG. 1 is a block diagram showing an overall schematic configuration of a terminal device and a minimal functional block of a second domain according to a first embodiment.

Embodiments of the present invention will be described hereinafter with reference to the drawings. In the following description of the drawings, a same or similar reference numeral is given to a same or similar part. However, it should be noted that the drawings are schematic.

[First Embodiment]
(Configuration of Terminal Device)

A configuration of a terminal device 1 according to a first embodiment of the present invention will be described. The present invention is intended for a terminal device having a function to cause multiple domains to operate. In addition, in this embodiment, the terminal device 1 is assumed to be a mobile phone, a PDA (personal digital assistants), a PC or the like that executes such a software program as an operating system (hereinafter referred to as OS) and an application, on the multiple domains.

Here, in this embodiment, a domain refers to one independent processing core composed of a processor or a RAM (random access memory), irrespective of whether it is logical or physical. An example of an embodiment physically having multiple domains includes: a multimedia mobile terminal having a DSP (digital signal processor) as a sub domain, separately from a main domain, so as to achieve fast operation or low power consumption; an information mobile terminal having as a sub domain a cryptography accelerator that conforms to IPSec (security architecture for Internet protocol); or the like. In particular, many types of the DSPs and the cryptography accelerators perform processing after receiving an instruction from a main domain, and remains in an idle or dormant state until receiving the instruction.

A multi-core processor in which one processor has multiple processing cores is also an embodiment physically having multiple domains. In addition, a virtual machine such as Trust Zone of ARM Ltd. or VMware is an example of a method for dividing a computer resource by spatiotemporally dividing one processing core and for thereby having logically multiple domains.

Each of the multiple domains described above operates independently, and an OS running on the domain also operates independently. The present invention relates to a device and a method in which a main domain (hereinafter referred to as a first domain) performing a large part of processes of the terminal device 1 and a sub domain (hereinafter referred to as a second domain) assisting the main domain are used in such a way that a software program including an OS runs in a normal manner on the first domain while an OS different from the OS running on the first domain runs on the second domain so that the second domain can check all the software programs of the first domain in parallel. That is, in the terminal device 1, the first domain and the second domain do not run one OS but run different OSs independently and in parallel. In addition, the first domain and the second domain may be configured to run an OS of the same type by using independent, distinct codes. In addition, at startup of the second domain, the second domain starts checking of a software program that is executable in the first domain. When any abnormality is detected in a software program of the first domain, the second domain may stop or reset the starting of the terminal device, or alternatively, stop execution or prohibit execution of the abnormal software program, during the operation of the first domain.

FIG. 1 is a functional block diagram showing a configuration of the terminal device 1 according to this embodiment. As shown in FIG. 1, the terminal device 1 according to this embodiment includes a first domain 10 and a second domain 20.

The first domain 10 is configured to execute multiple basic software programs to be used in the terminal device 1. Specifically, the first domain 10 is configured to execute a software program such as an OS which is fundamentally used in the terminal device 1, or an application to be started on the OS. Here, all of these software programs are stored in advance.

In this embodiment, a software program is classified into a first software program to be constantly executed and a second software program to be executed with predetermined frequency. For example, an OS is a software program which is always executed when the terminal device 1 is started, and is thus included in the first software program to be constantly executed. In addition, applications include a first software program (application) to be constantly executed and a second software program (application) to be executed with predetermined frequency. For instance, taking a mobile phone as an example, a telephone application that is always running, or the like may be the first software program. In addition, a game application started by user operation, or the like may be the second software program to be executed with predetermined frequency.

The second domain 20 is configured to start an OS for causing various functions to operate. The second domain 20 is also configured to check (detect) whether or not multiple software programs to be executed by the first domain 10 are safe. Specifically, the second domain 20 is configured to check whether or not a software program stored in the first domain 10 is safe. If it is detected that the software program is unsafe, for example, the second domain 20 is configured to perform a process such as prohibiting execution of target software program in the first domain, stopping start or execution of the first domain 10, or resetting the terminal device itself, in order to ensure security of the terminal device 1. In addition, as shown in FIG. 1, the second domain 20 includes functions such as an execution sequence storage unit 111, a software program checking unit 117, an execution restricting unit 123 and the like. Processes, for ensuring security are performed by mainly using these functions.

In addition, it is desirable that the second domain 20 that checks the first domain 10 ensures a high security level. Thus, in order to improve security, the second domain 20 may be configured to utilize a secure execution space provided by Trust Zone of ARM Ltd. or the like, or alternatively a secure processor that achieves a high security level by being isolated from a main processor. Each of the functions provided to the second domain 20 will be described hereinafter.

(Configuration of Second Domain)

A configuration of the second domain 20 will be specifically described below. As shown in FIG. 1, the second domain 20 includes the execution sequence storage unit 111, the software program checking unit 117, and the execution restricting unit 123.

In the execution sequence storage unit 111, execution priority corresponding to software program to be executed in the first domain 10 is stored. The execution priority is information to be used as a sequence of checking when the software program checking unit 117 to be described later checks software program. Here, in general, an execution sequence of a kernel, a device driver, a daemon program operating as a server, an application which automatically starts, and the like is statically defined in an OS. The execution sequence storage unit 111 is configured to store a sequence of statically executing them for the QS of the first domain 10, as the execution priority.

Incidentally, when execution priority is specified, multiple software programs may be treated as one software program. For example, a kernel and multiple device drivers may be combined as a software program and stored in the execution sequence storage unit.

The software program checking unit 117 is configured to perform checking of software program of the first domain 10 according to the execution priority stored in the execution sequence storage unit 111. It is desirable to start the checking immediately after startup of the OS of the second domain is completed. In addition, in order to ensure safety, it is desirable that the software program checking unit 117 check (detect) whether or not all the software programs stored in the first domain 10 are safe.

Examples of a method for checking software program include: a method for figuring out and storing in advance a checksum or a hash value for a software program code, as well as for reading and matching the software program at the time of checking; a method for checking whether or not there is any manipulation, by using an electronic signature accompanying a software program code; and the like. In the execution sequence storage unit 111 described above, information on program codes necessary for the checking, as well as a check sum list and a hash value as necessary, are stored. In fact, the software program checking unit 117 is configured to perform checking by utilizing such information, a public key cryptosystem which uses a hash computing function or an RSA scheme, and the like.

Based on a check result of a software program checked by the software program checking unit 117, the execution restricting unit 123 is configured to give an instruction on the action to be performed when the software program is executed by the first domain 10. For example, the execution restricting unit 123 is configured to instruct the first domain 10 to prohibit its execution of a software program that is determined to be unsafe. The execution restricting unit 123 is also configured to give a stop instruction (instruction to prohibit execution) when the first domain 10 is executing the software program that is determined to be unsafe. In addition, the execution restricting unit 123 may delete a software program that is determined to be unsafe, reset the first domain 10 or the terminal device 1, or stop execution thereof. In this way, when the software program checking unit 117 obtains a check result indicating that multiple software programs include unsafe software program, the execution restricting unit 123 is configured to restrict the execution of the software program before checking of all the multiple software programs is completed.

(Detailed Configuration of Second Domain)

Figure 2:
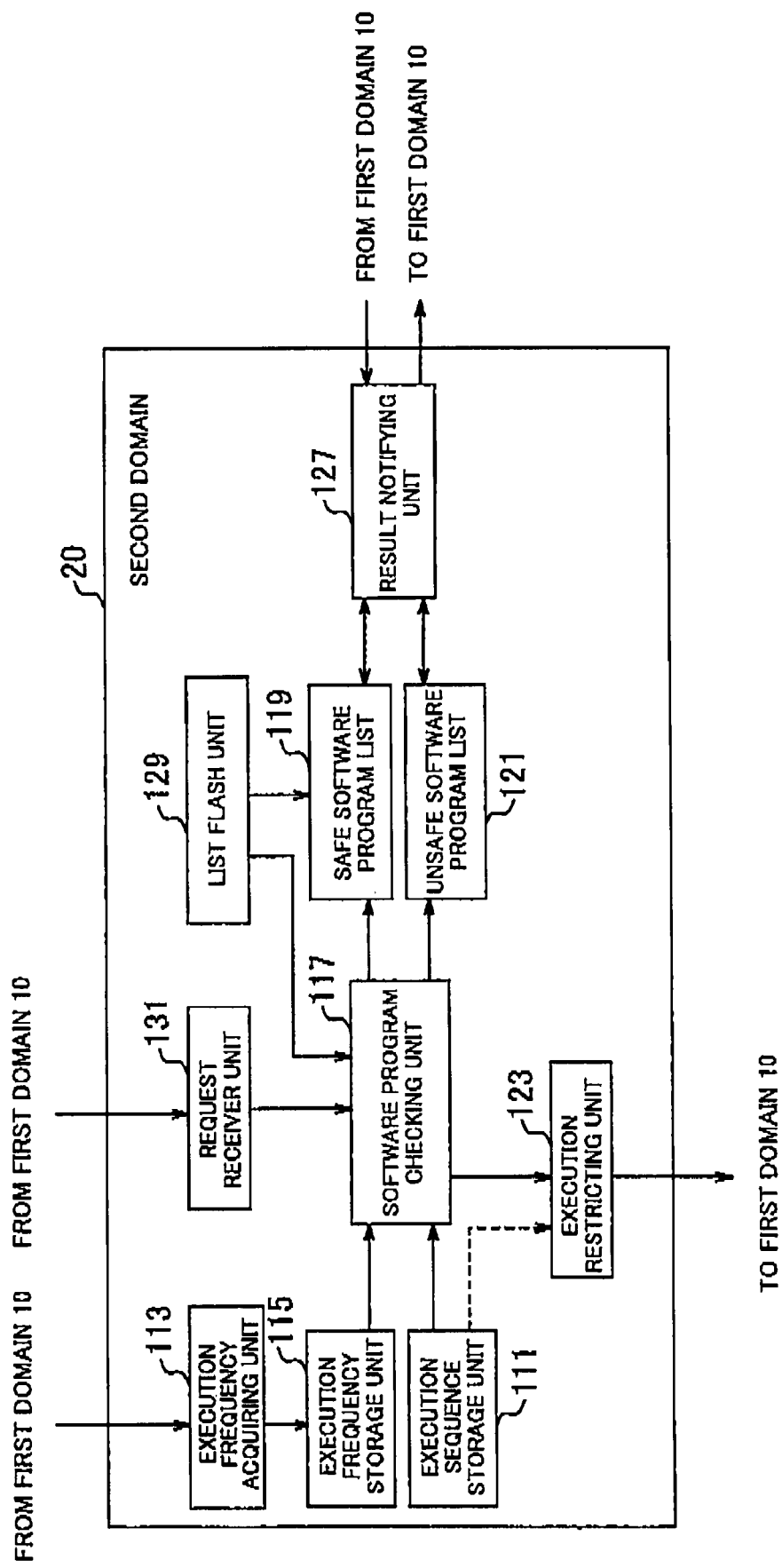
FIG. 2 is a functional block diagram specifically showing a configuration of the second domain according to the first embodiment.

A configuration of the second domain 20 will be described in detail hereinafter. FIG. 2 is a functional block diagram specifically showing a configuration of the second domain 20. As shown in FIG. 2, the second domain 20 includes the execution sequence storage unit 111, an, execution frequency acquiring unit 113, an execution frequency storage unit 115, the software program checking unit 117, a safe software program list 119, an unsafe software program list 121, the execution restricting unit 123, a result notifying unit 127, a list flash unit 129, and a request receiver unit 131.

As described above, the execution sequence storage unit 111 is configured to store the execution priority corresponding to software programs to be executed by the first domain 10. FIG. 3 shows an illustrative example of information stored in the execution sequence storage unit 111. As shown in FIG. 3, the execution sequence storage unit 111 is configured to store a software program ID (identification information) that identifies a software program stored in the first domain 10, the execution priority of the software program to be executed by the first domain 10, a hash value necessary for checking of the software program, and the like, in association with one another.

The software program ID may, be identification information which is given to one software program or identification information which is given to multiple software programs combined as one set. In addition, the software program ID may be a file name, an address where the software program is arranged, or both of an address and size of the software program.

In the illustrative example shown in FIG. 3, the execution priority is specified. However, the execution priority does not have to be explicitly specified. Instead, as shown in an example of FIG. 9, a sequence from the head of a storage area may be used as the execution priority.

Furthermore, as shown in FIG. 10, the execution sequence storage unit 111 may store, for each of multiple software programs, specification as to which domain performs the checking thereof. Specifically, as shown in FIG. 1, the first domain 10 may also be configured to include a sub software program checking unit 300 that checks whether or not a software program is safe. In this case, the execution sequence storage unit 111 stores each of the software programs in association with either first domain identification information identifying the first domain 10 or second domain identification information identifying the second domain 20. In the illustrative example shown in FIG. 10, it is specified that a software program with the software program ID of "1" is checked by the first domain (domain ID=1), and a software program with a different software program ID is checked by the second domain (domain ID=2).

Thus, the software program checking unit 117 of the second domain 20 is configured to check the stored software program associated with the second domain identification information, and the sub software program checking unit 300 of the first domain 10 may be configured to check the stored software program associated with the first domain identification information.

In an illustrative example shown in FIG. 11, for each of the software programs, the execution sequence storage unit 111 is configured to retain specification of a checking timing of either when the terminal device 1 starts and after the terminal device 1 starts, or both of them. Specifically, the execution sequence storage unit 111 is configured to store the software program in association with timing information (at startup, after completion of startup, or both at and after completion of startup) indicating at least one of timing when the terminal device 1 starts and timing after the terminal device 1 starts. In the illustrative example shown in FIG. 11, it is specified that a software program with the software program ID "1" is checked at startup of the first domain (domain ID=1), and a software program with the software program ID "2" is checked both at and after completion of startup of the second domain (domain ID=2).

In this case, the software program checking unit 117 of the second domain 20 and the sub software program checking unit 300 of the first domain may be configured to check whether or not the a software program is safe, according to the timing information and the execution priority.

In an illustrative example shown in FIG. 4, the execution sequence storage unit 111 is configured to store: software program IDs of the first software programs such as the OS or an application to be constantly executed; and software program IDs of the second software programs such as applications to be executed by the first domain 10 with predetermined frequency.

In addition, the execution sequence storage unit 111 is configured to preferentially store the execution priority of the first software program to be constantly executed, rather than the execution priority of the second software program to be executed with predetermined frequency. Specifically, in the execution sequence storage unit 111, the first software program such as the OS or the application to be constantly executed is stored in association with the execution priority, while the second software program such as the application to be executed with predetermined frequency is not stored in association with the execution priority. In this case, it does not mean that the second software program that is executed with predetermined frequency has no execution priority but that its execution priority is stored as the lowest execution priority.

Every time a software program is executed in the first domain 10, the execution frequency acquiring unit 113 is configured to acquire the software program ID (identification information) identifying the executed software program, from the first domain 10. In addition, every time the execution frequency acquiring unit 113 acquires the software program ID, it accumulates the number of acquisition times of the software program ID that has been acquired within a predetermined period of time (e.g., one week or the like) and stores the accumulated number in the execution frequency storage unit 115. In addition, the execution frequency acquiring unit 113 may also be configured to erase and update the execution frequency on a regular basis (e.g., every predetermined period). Additionally, the execution frequency acquiring unit 113 is configured to mainly acquire the execution frequency of the second software program to be executed with predetermined frequency, rather than that of the first software program to be constantly executed in the first domain 10.

The execution frequency storage unit 115 is configured to store the execution frequency of the software program to be executed with predetermined frequency in the first domain 10. Furthermore, the execution frequency storage section 115 is configured to store the execution priority of a software program which is included in the software program to be executed in the first domain 10 and whose execution priority is not stored in the execution sequence storage unit 111. The information is stored by the execution frequency acquiring unit 113. FIG. 4 shows an illustrative example of information to be stored in the execution frequency storage unit 115. As shown in FIG. 4, the execution frequency storage unit 115 is configured to store the software program IDs in association with the execution frequency. In addition, the information stored in the execution frequency storage unit 115 is read by the software program checking unit 117, which will be described later, and used when the sequence of checking software program is to be determined.

The software program checking unit 117 is configured to refer to the execution priority stored in the execution sequence storage unit 111, and to check (determine) a software program stored in the first domain 10, according to the execution priority. In addition, the software program checking unit 117 may be configured to preferentially check the first software program on whether or not it is safe, rather than the second software program. Specifically, after performing checking of the first software program, the software program checker 117 is configured to refer to the execution frequency storage unit 115 for the second software program, and to check whether or not the second software program stored in the first domain 10 is safe. Then, by using the execution frequency stored in the execution frequency storage unit 115 as the execution priority, the software program checking unit 117 may be configured to check whether or not each of the second software programs corresponding to the execution frequency is safe, in descending order of the execution frequency.

In addition, the software program checking unit 117 is configured to check whether or not one or more than one software program is safe, every predetermined period. Specifically, when receiving a notice instructing the software program checking unit 117 to execute checking, every predetermined period, then the software program checking unit 117 is configured to refer to information stored in the execution sequence storage unit 111 and the execution frequency storage unit 115, and to perform checking of the software program. In this event, in order to improve processing efficiency, the software program checking unit 117 may be configured to re-check only software program corresponding to the software program ID stored in the safe software program list 119 that has been determined to be safe last time.

In addition, when the request receiver unit 131 receives check request information requesting a check on whether or not a specific software program is safe, from the first domain 10, the software program checking unit 117 is configured to give preference to the software program (the specific software program) corresponding to the software program ID included in the check request information and to check whether or not the software program is safe. For example, in the case where the request receiver unit 131 receives check request information from the first domain 10 while the software program checking unit 117 is performing a checking process for certain software program on whether or not it is safe, the software program checking unit 117 is configured to suspend the checking process and to check whether or not the software program corresponding to the software program ID included in the check request information is safe.

The software program checking unit 117 is also configured to store a check result in the safe software program list 119 and the unsafe software program list 121. Specifically, when the software program checking unit 117 determines that a software program is safe as a result of checking whether or not the software program is safe, the software program checking unit 117 is configured to store a software program ID identifying the software program, in the safe software program list 119. In addition, when the software program checking unit 117 determines that a software program is unsafe as a result of checking whether or not the software program is safe, the software program checking unit 117 is configured to store a software program ID identifying the software program, in the unsafe software program list 121. In addition, the software program checking unit 117 is configured to notify the execution restricting unit 123 of the check result and the software program ID. In response to this notice, the execution restricting unit 123 is configured to control the operation of the first domain 10.

The safe software program list 119 stores identification information of a software program that the software program checking unit 117 has determined to be safe. Specifically, the safe software program list 119 stores a software program ID (identification information) corresponding to a software program which is determined as a non-tempered, safe software program, as a result of checking by the software program checking unit 117. In addition, the unsafe software program list 121 stores identification information of a software program that the software program checking unit 117 has determined to be unsafe. Specifically, the unsafe software program list 121 stores a software program ID corresponding to a software program which is determined as a tempered, unsafe software program, as a result of checking by the software program checking unit 117. The software program group stored in these two lists are notified of to the first domain 10 by the result notifying unit 127 to be described later, when the result notifying unit 127 receives result request information requesting the check result, from the first domain 10.

The list flash unit 129 includes an interval timer and is configured to regularly notify the software program checking unit 117 of implementation of checking. In addition, at this time, the list flash unit 129 is configured to erase the information stored in the safe software program list 119 partially or wholly. Here, since a software program that has been once determined to be safe may possibly be tampered during run time, the list flash unit 129 is configured to ensure security by prompting the software program checking unit 117 to regularly perform checking.

The execution restricting unit 123 is configured to give an instruction on the action to be performed when the first domain 10 executes a software program, in accordance with a check result of the software program checking unit 117. The execution restricting unit 123 is also configured to restrict action of the first domain 10, as necessary, such as instructing the first domain 10 to prohibit its execution of a software program, or instructing it to suspend execution, and may forcibly reset the first domain 10 in some cases.

Note that the execution restricting unit 123 may also be configured to instruct the first domain 10 to prohibit its execution of a software program until checking of whether or not all the software programs stored in the first domain 10 are safe is completed. In such a case, the execution restricting unit 123 can suspend the OS startup that is being executed in the first domain 10, until the software program checking unit 117 completes the checking of all the software programs stored in the execution sequence storage unit 111, for example. In addition, the execution restricting unit 123 can also suspend the OS, startup that is being executed in the first domain 10, until the OS startup in the second domain 20 is completed. In this way, by the execution restricting unit 123 restricting the action of the first domain, in the terminal device 1, the first domain 10 becomes able to execute a software program in a secure condition after checking is completed.

The result notifying unit 127 not only receives the result request information requesting the check result of a software program checked by the software program checking unit 117, from the first domain 10, but also transmits result response information including the identification information stored in the safe software program list 119 and the identification information stored in the unsafe software program list 121, to the first domain 10. In this way, the first domain 10 can acquire information on checked software program group by utilizing the result notifying unit 127. In addition, if the safe software program list and the unsafe software program list are arranged in a memory (RAM) or a storage which is accessible from the first domain 10, the first domain 10 can acquire information on the checked software program group even without a procedure of receiving the result request information or transmitting the result response information.

When receiving check request information requesting a check of a certain software program, from the first domain 10, the request receiver unit 131 is configured to notify the software program checking unit 117 of the check request information. Then, the request receiver unit 131 is configured to notify the software program checking unit 117 of an abort of checking process which is currently executed, and to prompt the software, program checking unit 117 to preferentially check a software program requested by the check request information. In this way, when the first domain 10 executes, for example, a software program that has not been checked by the software program checking unit 117, the first domain 10 can request the software program checking unit 117 to check the software program.

Note that when it is determined as a result of the checking that the software program is safe, the software program checking unit 117 is configured to notify the first domain 10 of that fact through the execution restricting unit 123. In addition, when it is determined that the software program has been tampered and is therefore unsafe, the execution restricting unit 123 is configured to immediately respond to this determination and to prompt the first domain 10 to prohibit its execution of the software program if it is before execution of the software program.

(Operation of Terminal Device)

The operation of the terminal device 1 configured as mentioned above will be described hereinafter. Specifically, in the terminal device 1, descriptions will be given of: a control operation for execution of a software program check by the second domain 20 when the first domain 10 and the second domain 20 start; and a control operation of when receiving a check request from the first domain 10 while the second domain 20 is checking software program.

(Operation of when Terminal Device Starts)

Figure 5:
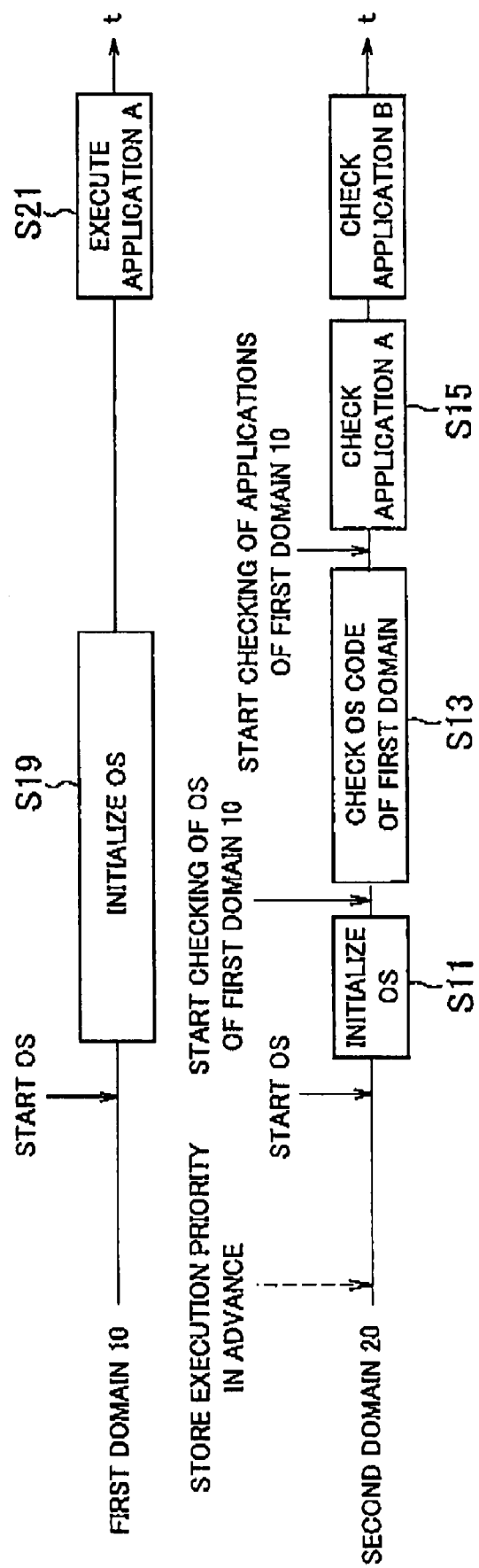
FIG. 5 is a diagram showing the operations through time when a first domain and a second domain start in the first embodiment.

First, the control operation in which, when the terminal device 1 starts, the first domain 10 and the second domain 20 start and then the second domain 20 executes checking of a software program will be described with reference to FIG. 5. FIG. 5 shows the operation through time of when the first domain 10 and the second domain 20 start. Note that, as a premise, the execution priority of a software program to be executed in the first domain 10 is stored in advance in the execution sequence storage unit 111 of the second domain 20. In addition, since the second domain 20 is a subject that performs checking of the first domain 10, safety for the second domain 20 must be ensured. Thus, in this embodiment, the second domain 20 is assumed to be provided with a secure boot function. That is, in a start procedure (boot procedure) in the second domain 20, a software program to be executed next is executed after the software program is checked and is determined to be valid. Specifically, a first loader to be started first executes a second loader after checking the second loader, which then executes a kernel after checking a kernel unit of the OS.

In step S11, the first domain 10 and the second domain 20 begin booting when the terminal device 1 starts, and the OS is initialized in each of the first domain 10 and the second domain 20. In the second domain 20, after the initialization of the OS is completed, checking of the first domain begins. In order to begin the checking, soon, the software program checking unit 117 and the like may be configured to run as a device driver in the second domain 20. In such a case, the software program checking unit 117 can start checking of a software program even before the initialization of the second domain 20 is completed.

In the first domain 10, depending on how timings to start the first domain 10 and the second domain 20 are configured, a software program which has not yet been checked may be executed in the first domain 10. To address this, three approaches can be taken.

In a first approach A, the execution sequence storage unit 111 is configured to store some software programs to be executed first by the first domain 10, and thereby the software program is checked before the first domain 10 executes these software programs. As an illustrative example, when the execution sequence storage unit 111 stores the domain IDs and the software program IDs in association with each other as shown in the example in FIG. 10, the sub software program checking unit 200 of the first domain 10 is configured to find out that a specific software program needs to be checked before the specific software program is executed, and thus to check the specific software program. This prevents a software program that has not been checked from being executed in the first domain 10.

In a second approach B, the first domain 10 is configured to refer to the safe software program list before executing a software program, and then either to execute the software program if it is included in the safe software program list 119 or to block (restrict) execution of the software program if it is not included in the safe software program list 119. After the blocking, the first domain 10 is configured to refer to the safe software program list 119. If finding out that the software program becomes included in the safe software program list 119, the first domain 10 is configured to release the block and to execute the software program.

In a third approach C, the execution restricting unit 123 is configured to suspend the operation of the first domain 10 until the software program check of the OS of the first domain 10 by the software program checking unit 117 is finished. For example, if it is desired to ensure security of the OS for which a software program to be statically executed is defined, the execution restricting unit 123 is configured to delay the startup of the first domain 10 until the software program checking unit 117 finishes checking of a software program (i.e., a first software program) corresponding to the execution priority stored in the execution sequence storage unit 111.

In step S13, in the second domain 20, the software program checking unit 117 starts checking of a software program according to the execution priority stored in the execution sequence storage unit 111, after the initialization of the OS of the second domain 20 is completed. The execution priority stored in the execution sequence storage unit 111 is a code (first software program) of the OS to be first executed in the first domain 10. Specifically, a kernel, a device driver, and a daemon program operating as a server are described in the code. In addition, the software program checking unit 117 may store the check result in the safe software program list 119 and the unsafe software program list 121.

Step S15 is an optional step in which, in the second domain 20, after finishing the checking of a software program corresponding to the execution, priority stored in the execution sequence storage unit 111, the software program checking unit 117 subsequently refer to the execution frequency storage unit 115, and executes checking of a software program (second software program) corresponding to the stored execution frequency, in descending order of the execution frequency.

In the second domain 20, the result notifying unit 127 transmits result response information including the check result to the first domain 10 when receiving result request information from the first domain 10.

In addition, in the second domain 20, the execution restricting unit 123 may instruct the first domain 10 to prohibit its execution of a software program determined to be unsafe by the software program checking unit 117. If the second domain is provided with a function to safely retain a software program of the terminal device 1 by means of backup or the like, the execution restricting unit 123 may be configured to delete a software program determined to be unsafe by the software program checking unit 117, update the deleted software program to safe a software program being retained, and store the safe software program in the first domain 10.

In step S19, the first domain 10 performs a normal OS start operation to initialize the OS of the first domain 10.

In step S21, after the initialization of the OS of the first domain 10 is completed, the first domain 10 executes a software program such as an application. Then, the first domain 10 may refer to the safe software program list 119 and block execution of a software program in such a way that only software program, such as an application, determined to be safe by the software program checking unit 117 of the second domain 20 is executed. Otherwise, the first domain 10 may skip execution of a software program which has not been checked, and execute a different software program instead. In the latter case, the first domain 10 can execute a software program determined to be safe by the software program checking unit 117, even before checking of all the software programs stored in the first domain 10 is completed.

In addition, when executing a software program, the first domain 10 may notify the execution frequency acquiring unit 113 of the second domain 20 of the software program ID corresponding to the software program to be executed. Based on the notification, the execution frequency acquiring unit 113 accumulates the number of times that the software program ID is acquired within a predetermined period, figures out the execution frequency of the corresponding software program in the first domain 10, and stores the execution frequency in the execution frequency storage unit 115. In addition, using the information, the software program checking unit 117 of the second domain 20 checks whether, or not a software program is safe, according to the execution frequency stored in the execution frequency storage unit 115 as the execution priority of a software program to be checked.

In addition, before executing a software program, the first domain 10 may transmit result request information to the result notifying unit 127 of the second domain 20 and receive result response information from the result notifying unit 127. Moreover, based on the result response information, the first domain 10 determines which software program is determined to be unsafe by the software program checking unit 117. Then, the first domain 10 executes the software program excluding the software program determined to be unsafe. That is, the first domain 10 does not execute a software program corresponding to the software program ID stored in the unsafe software program list 121, among the software program IDs included in the result response information. In addition, the first domain 10 performs a determination on all the software program IDs included in the result response information so as to determine whether or not the software program whose execution is to be now started has been checked by the software program checking unit 117 of the second domain 20. This determination allows the first domain 10 to execute a software program which has been, determined to be safe. In addition, when the result response information notified of from the result notifying unit 127 does not include identification information of a specific software program whose execution is to be now started, the first domain 10 transmits check request information which requests a check on whether or not the specific software program is safe, to the request receiver 131. Then, the first domain 10 requests a check on a target software program by transmitting the check request information including the software program ID of the specific software program to be subjected to the check.

Now, in this embodiment, the first domain 10 executes either a method (1) or a method (2). In the method (1), when transmitting the check request information, the first domain 10 suspends execution of the software program which the first domain 10 has requested to check, until receiving an instruction from the execution restricting unit 123. In the method (2), when transmitting the check request information, the first domain 10 immediately starts to execute the software program.

For example, in the method (1), when transmitting the check request information, the first domain 10 stops execution of the software program which the first domain 10 has requested to check, until receiving an instruction from the execution restricting unit 123 of the second domain 20. In addition, in this method, when the software program checking unit 117 determines that the software program (specific software program) requested in the check request information is safe, the execution restricting unit 123 instructs the first domain 10 to execute the software program. Then, the first domain 10 restarts the execution of the software program. In addition, if the software program checking unit 117 determines that the software program is unsafe, the execution restricting unit 123 instructs the first domain 10 to prohibit its execution of the software program. Then, the first domain 10 cancels the execution of the software program.

In the method (2), when transmitting the check request information, the first domain 10 immediately executes the software program which the first domain 10 has requested to check. In this method, when the software program checking unit 117 determines that a software program (a specific software program) running in the first domain 10 is unsafe, the execution restricting unit 123 of the second domain 20 instructs the first domain 10 to stop its execution of the specific software program and to also prohibit its subsequent execution. In addition, for any software program determined to be safe, the execution restricting unit 123 of the second domain 20 does nothing on the first domain 10.

As described above, in the terminal device 1, the first domain 10 can set either the method (1) or (2) when executing an unchecked software program. In addition, it is preferable to set either the method (1) or (2) in accordance with performance such as arithmetic processing capability or the like of the terminal device 1.

In addition, when the software program checking unit 117 of the second domain 20 starts checking of the software programs stored in the first domain 10 at the time of startup of the second domain 20, and generally finishes checking of all the software programs, the software program checking unit 117 restarts the checking of the software program after some time (predetermined period) is elapsed. Then, in order to improve the efficiency of the checking process, the software program checking unit 117 of the second domain 20 checks only software program determined to be safe in the last check. In this event, when performing the check on the basis of the execution priority and the execution frequency stored respectively in the execution sequence storage unit 111 and the execution frequency acquiring unit 113, the software program checking unit 117 refers to the safe software program list 119 and performs checking of only software program that has already been determined to be safe.

(Operation when Application is Checked)

Figure 6:
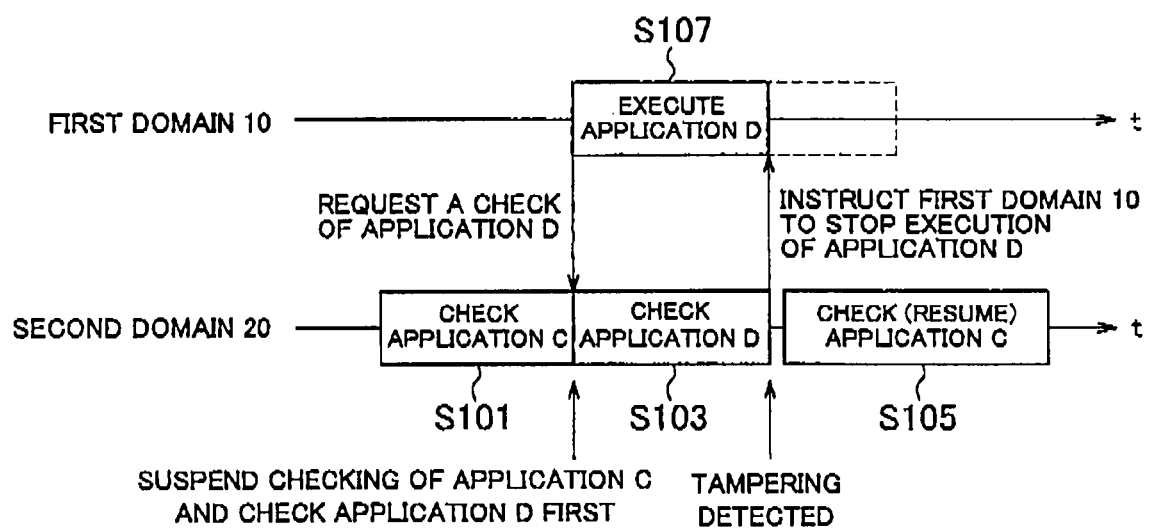
FIG. 6 is a diagram showing the operations through time when the first domain executes software program and the second domain checks the software program in the first embodiment.

Hereinafter, the control operation at the time of checking the second software program such as an application to be executed with predetermined frequency by the first domain 10 and the second domain 20 will be specifically described with reference to FIG. 6. Here, it should be noted that a description will be given by taking an example, namely the above-described method (2) in which the first domain 10 transmits check request information requesting a check of software program, and immediately thereafter starts to execute the software program.

In step S101, in the second domain 20, the software program checking unit 117 is performing checking of an application C. Then, in the second domain 20, it is assumed that the request receiver unit 131 has received the check request information from the first domain 10.

In step S103, in the second domain 20, the software program checking unit 117 suspends the check of the application C, which is currently running, and checks whether or not a software program (an application D, for example) corresponding to a software program ID included in the check request information received by the request receiver unit 131 is safe. In addition, in this event, if the software program checking unit 117 determines that the application D is unsafe, the software program checking unit 117 notifies the execution restricting unit 123 of that fact. Upon receipt of the notification, the execution restricting unit 123 instructs the first domain 10 to stop its execution of the application D and to prohibit its subsequent execution.

In step S105, in the second domain 20, after checking the software program of the received check request, the software program checking unit 117 resumes the check of the software program whose check is suspended earlier, and subsequently continues the check of the software program corresponding to the execution priority and the execution frequency stored in the execution sequence storage unit 111 and the execution frequency acquiring unit 113.

In step S107, the first domain 10 transmits check request information of the application D to the second domain 20, and concurrently starts to execute the application D. In addition, when the first domain 10 currently executing the application D is instructed by the execution restricting unit 123 to stop the execution, the first domain 10 immediately stops the execution.

(Advantageous Effect)

With the terminal device 1 according to this embodiment, in the second domain 20, the software program checking unit 117 is configured to check (determine) whether or not multiple software programs are safe, according to execution priority. In addition, the first domain 10 can execute a software program that is determined to be safe, even before the software program checking unit 117 checks whether or not all the software programs stored in the first domain 10 are safe.

Hence, as in a conventional technique, in the terminal device 1, the first domain 10 can execute a software program whose check is completed and which is determined to be safe, even without checking whether or not all the multiple stored software programs are safe. In addition, in the terminal device 1, the software program checking unit 117 automatically checks a software program in sequence according to the execution priority or execution frequency that is stored in advance. Accordingly, a standby period until the first domain 10 acquires check results in order to execute a software program can be reduced to a more extent than otherwise.

In addition, with the terminal device 1 according to this embodiment, in the second domain 20, checking of whether or not a software program is safe is performed by the software program checking unit 117 preferentially on the software program (first software program) to be constantly executed by the first domain 10, rather than the software program (second software program) to be executed with predetermined frequency. Thus, it is possible to reduce more a standby period when the first domain 10 waits for a check in order to execute a software program. In addition, the software program checking unit 117 automatically checks software programs such as applications in sequence, in accordance with the execution frequency. Thus, when the first domain executes a software program in response to a user's request, an environment in which the check of the software program has already been completed can be provided more promptly than otherwise. Furthermore, in that case, it is more likely that the standby time itself during which the first domain 10 waits for the check result will be eliminated.

Thus, according to such aspect, while preventing degradation of security due to checking of a software program, the terminal device 1 can reduce an increase in startup time of an OS or an application due to the checking. Accordingly, with the terminal device 1, it is possible to minimize an increase in the startup time while ensuring safety of a software program whose capacity has become larger, and to exhaustively check software programs.

In addition, with the terminal device 1 according to this embodiment, in the second domain 20, the execution restricting unit 123 is configured to restrict the operation of the first domain 10 on the basis of check result of a software program checked by the software program checking unit 117. Accordingly, the execution restricting unit 123 can prohibit execution of a software program that is determined to be unsafe and ensure security of the terminal device 1. In addition, in the second domain 20, since the result notifying unit 127 is configured to notify check, result in response to a request of the first domain 10, the first domain 10 can immediately find out check result.

In addition, with the terminal device 1 according to this embodiment, in the second domain 20, it is possible to reliably manage a safe software program and an unsafe software program by means of the safe software program list 119 and the unsafe software program list 121.

In addition, with the terminal device 1 according to this embodiment, in the second domain 20, the software program checking unit 117 regularly checks every predetermined period whether or not multiple software programs are safe, in response to the instruction of the list flash unit 129. Thus, security can be ensured by re-checking a software program, even after the software program is once determined to be safe through a check. In addition, in this event, since the software program checking unit 117 checks only software program determined to be safe last time, the software program checking unit 117 no longer needs to perform unnecessary processing, thus reducing the arithmetic processing load.

With the terminal device 1 according to this embodiment, since the first domain 10 does not execute a software program determined to be unsafe by its check result, security can be ensured. In addition, when a software program scheduled to be now executed by the first domain 10 has not been checked, the first domain 10 requests a check of the software program. Further, in the second domain 20 that has received the request, the software program checking unit 117 preferentially checks the requested software program. Hence, it is possible to reduce a standby period of the first domain 10 until acquiring check result.

With the terminal device 1 according to this embodiment, as one method (method (1)) in the case of requesting a check, the first domain 10 stops execution of a software program until receiving an instruction from the execution restricting unit 123 of the second domain 20. Accordingly, when a specific software program is unsafe, any personal information or the like can be prevented from leaking by the specific software program, thereby ensuring a higher level of security than otherwise. In addition, as another method (method (2)) in the case of requesting a check, the first domain 10 immediately starts execution of the requested software program in parallel, and consequently can prevent a time period required for a software program to start from becoming long. In addition, in this case as well, in the second domain 20, if the software program checking unit 117 determines that the requested software program is unsafe, the execution restricting unit 123 instructs the first domain 10 to immediately stop the execution, thereby ensuring security.

In addition, in the second domain 20, until the software program checking unit 117 completes checking of whether or not all the software programs are safe, the execution restricting unit 123 can instruct the first, domain 10 to prohibit its execution of a software program. Accordingly, it is possible to provide a high security environment, in accordance with what the user desires.

In addition, in general, when the terminal device 1 is driven by a battery or the like, power saving is desired. In a conventional technique, when the terminal device starts an OS, for example, each of stored software programs is subjected to detection of whether or not it is safe. Thus, much power is consumed before a software program such as an application becomes available to the user. Thus, when power accumulated in the battery is very low, it is not possible to provide the user with even a condition in which the user can use a software program, in some cases. However, with the terminal device 1 according to this embodiment, since the OS is started as usually, it is possible to provide the user with a condition in which the user can use an application.

[Second Embodiment]

(Configuration of Terminal Device According to Second Embodiment)

A configuration of a terminal device 1 according to a second embodiment of the present invention will be described hereinafter, focusing on differences from the first embodiment described above. In the second domain 20 of the terminal device 1 according to the first embodiment described above, the execution restricting unit 123 is configured to instruct the first domain 10 to stop its execution (or to prohibit its execution) of a software program determined to be safe by the software program checking unit 117. However, it is assumed that the first domain 10 cannot respond to an instruction from the second domain 20 when the first domain 10 has already executed the software program or when the first domain 10 has already been tampered and thus cannot receive the instruction from the second domain 20. In addition, it is assumed that, in the case where the software program includes setting information or the like to be referred to at startup of the OS, and where the software program, which is not currently executed (referred to) by the first domain 10, is determined to be unsafe, restart needs to be performed before the software program is executed by the first domain 10. In this respect, in this embodiment, a description will be given of processing to be executed by the second domain 20 when the first domain 10 cannot respond to the instruction or needs to restart. First, in the second domain 20 according to this embodiment, when the first domain 10 executes a software program and when abnormality is detected in the first domain 10 because the first domain 10 has executed a tampered software program, for example, an execution restricting unit 123 resets (restarts) the first domain 10. In addition, when abnormality is detected in the second domain 20 because the second domain 20 has executed a tampered software program, through the process of checking whether or not a software program to be executed by the second domain 20 is safe, the execution restricting unit 123 resets the second domain 20. Note that the execution restricting unit 123 may be configured to reset the first domain 10 when abnormality such as a freeze is detected in the first domain 10. In addition, the execution restricting unit 123 is able not only to reset the first domain 10 but also reset the second domain 20 together. Moreover, the execution restricting unit 123 may reset the terminal device 1 itself if security of the second domain 20 cannot be ensured due to occurrence of abnormality, such as secure boot failure, in the second domain 20.

In addition, as shown in FIG. 7, in an execution sequence storage unit 111 according to this embodiment, a software program ID, execution priority, information showing what is to be instructed for the first domain 10 when software program corresponding to the software program ID is running, and information showing what is to be instructed for the first domain 10 when the software program corresponding to the software program ID is not running, are previously stored in association with one another.

In addition, as information indicating what is to be instructed in a state where the first domain 10 is executing a software program, the execution sequence storage unit 111 is configured to store therein "instruction information for controllable state" (execution stop, for example) indicating what is to be instructed in the case where the first domain is controllable, and "instruction information for uncontrollable state" (reset, for example) which indicates what is to be instructed in the case where the first domain is not controllable. Furthermore, as information indicating what is to be instructed in a state where the first domain 10 is not executing a software program, the execution sequence storage unit 111 is configured to store therein "instruction information for controllable state" (execution prohibition, for example) indicating what is to be instructed in the cases where the first domain 10 is controllable and "instruction information for uncontrollable state" (reset, for example) indicating what is to be instructed in the case where the first domain 10 is not controllable.

In addition, upon receipt of a notification of an ID of a software program that is determined to be unsafe as a result of a check, from the software program checking unit 117, the execution restricting unit 123 according to this embodiment is configured to judge whether or not the software program corresponding to the notified software program ID is running in the first domain 10. Note that when the execution restricting unit 123 receives a notification of an ID of a software program that is determined to be safe as a result of judgment, from the software program checking unit 117, the execution restricting unit 123 is configured to perform processing similar to that of the first embodiment described above. In addition, a method for judging whether or not the software program is running in the first domain 10 may be configured in the following way: every time the first domain 10 executes a software program, the first domain 10 is configured to notify the execution restricting unit 123 of the corresponding software program ID; and on the basis of this notification, the execution restricting unit 123 is configured to judge whether or not the software program that is judged to be unsafe is the software program running in the first domain 10.

In addition, after judging whether or not the software program is running in the first domain 10, the execution restricting unit 123 is configured to refer to the execution sequence storage unit 111 described above, and to control the operation of the first domain 10 on the basis of the "instruction information for controllable state" stored in the execution sequence storage unit 111, for either one of the executing state or the non-executing state.

Specifically, when judging that the software program is running, the execution restricting unit 123 is configured to instruct the first domain 10 on the operation of the software program (execution stop, for example) on the basis of the "instruction information for controllable state (execution stop, for example)" stored in the execution sequence storage unit 111, for the executing state, the "instruction information for controllable state" corresponding to the software program ID of the software program. In addition, even when judging that the software program is not running, the execution restricting unit 123 is configured to instruct the first domain 10 on the operation of the software program (execution prohibition, for example) on the basis of the "instruction information for controllable state (execution prohibition, for example)" for the non-executing state, the "instruction information for controllable state" corresponding to the software program ID of the software program.

Then, after giving the first domain 10 the instruction on the basis of the "instruction information for controllable state", the execution restricting unit 123 is configured to refer to the execution sequence storage unit 111 described above if the first domain cannot respond to the instruction, and then to control the first domain 10 on the basis of the "instruction information for uncontrollable state" stored in the execution sequence storage unit 111 for either one of the executing state or the non-executing state.

Specifically, when the first domain 10 is executing the software program and when the first domain 10 cannot respond to the instruction, the execution restricting unit 123 is configured to instruct the first domain 10 on the operation (deletion, for example) on the basis of the "instruction information for uncontrollable state (deletion, for example)" for the executing state, the "instruction information for uncontrollable state" being stored in the execution sequence storage unit 111 in association with the software program ID of the software program. In addition, when the first domain 10 is not executing the software program (non-executing state) and does not respond to the instruction, the execution restricting unit 123 is configured to instruct the first domain 10 on the operation (deletion, for example) on the basis of the "instruction information for uncontrollable state (deletion, for example)" for the non-executing state, the "instruction information for uncontrollable state" being stored in association with the software program ID of the software program. In addition, the execution restricting unit 123 may immediately perform deletion of the software program without giving the first domain 10 a "delete" instruction, when the "instruction information for uncontrollable state" corresponding to the software program ID is, for example, "delete", in the execution sequence storage unit 111.

In addition, the execution restricting unit 123 is configured to forcibly reset the first domain 10 when the "instruction information for uncontrollable state" corresponding to the software program ID is, for example, "reset", in the execution sequence storage unit 111. Note that the execution restricting unit 123 may also be configured to perform two processes such as "resetting" the first domain 10 after "deleting" the software program.

As described above, in the second domain 20 according to this embodiment, the execution restricting unit 123 is configured to perform execution stop (or execution prohibition) of a software program, deletion of a software program, reset of the first domain 10, and the like, on the basis of whether the first domain 10 can respond to the instruction (whether or not the first domain 10 is controllable). Accordingly, it is possible to appropriately perform control to ensure security, in accordance with the execution status of a software program in the first domain 10.

In addition, in the second domain 20 according to this embodiment, the execution restricting unit 123 is configured to reset the first domain 10 or the second domain 20 when abnormality is detected in the first domain 10 or when abnormality is detected in the second domain 20. Therefore, security of the terminal device 10 can be ensured.

[Third Embodiment]
(Configuration of Terminal Device According to Third Embodiment)

A configuration of a terminal device 1 according to a third embodiment of the present invention will be described hereinafter, focusing on differences from the first embodiment described above. As described above, the second domain 20 is applied to a second domain 20, such as a DSP or a cryptography accelerator, aimed to assist the first domain 10. For this reason, the second domain 20 is also invoked by the first domain 10 for the original purpose of the second domain 20. Thus, the second domain 20 is implemented as an equivalent of the original processing of the second domain 20. Assuming that the second domain 20 is introduced into a cryptography accelerator, the second domain 20 can implement processing of ciphers accepted from the first domain, as a task or a process. FIG. 8 is an image showing how a target of processing performed in the second domain 20 transits, in the terminal device 1 according to this embodiment.

For example, in the case where the second domain 20 is checking a software program (step S201), when the second domain 20 is requested by the first domain 10 to perform its original processing such as execution of a certain application, for example, the processing is scheduled by a kernel of the second domain 20 (step S203). Then, by setting a low priority to the check processing, the second domain 20 immediately responds to the request and switches its operation to the original application processing operation of the second domain 20 such as cryptography processing (step S205). In addition, when the second domain 20 completes, the requested application processing, the kernel schedules check processing and the second domain 20 resumes the task of checking the software program again (step S207).

In this way, in the second domain, the original processing is not affected and responsiveness to the first domain that has requested the processing is not deteriorated, and thus influence caused when the terminal device 1 is used can be minimized.

[Other Embodiments]

Although the present invention has been described with the aforementioned embodiments, it should not be understood that the description and the drawings that form a part of this disclosure limit the present invention. Various alternative embodiments, examples, and operating technique will become apparent to those skilled in the art from this disclosure.

For example, since the second domain 20 does not impose any special limitation on hardware such as a processor and a RAM, the second domain 20 can be introduced into a general-purpose processor such as a multi-core processor. In this case, by introducing the second domain 20 of the present invention into a multi-core compatible general-purpose processor, it becomes possible to maintain security of even a PC, a server, or the like without affecting its normal use.

As described above, it is apparent that the present invention includes various embodiments not described herein. In addition, each of the embodiments can be combined with one another. Accordingly, the technical scope of the present invention should be defined solely by specified matters of the invention according to the scope of claims that is valid with the above description.

Note that the content of Japanese Patent Application No. 2007-031380 (filed on Feb. 9, 2007) is incorporated herein by reference in its entirety.

Industrial Applicability

As described above, the terminal device and the method for checking a software program according to the present invention can reduce an increase in a startup time of an OS or an application due to checking of a software program, while ensuring security in the terminal device, and therefore are useful.

The invention claimed is:
1. A terminal device comprising:
a first domain configured to execute a plurality of software programs; and
a second domain configured to operate independently of the first domain and to check whether or not each of the plurality of software programs is safe, wherein
the second domain includes:
an execution sequence storage unit configured to store execution priority of the plurality of software programs to be executed by the first domain, the execution priority being stored prior to a start up of the terminal device and corresponding to a specified sequence in which a plurality of programs are to be executed in the first domain;
a software program checking unit configured to check whether or not the plurality of software programs are safe after the startup of the terminal device, according to the execution priority stored in the execution sequence storage unit, the first domain being configured to execute a first program in the specified sequence that has been checked by the second domain while the second domain performs processing for verifying a second program in the specified sequence; and an execution restricting unit configured to restrict the first domain from executing a software program included in the plurality of software programs and having a check result indicating that the software program is unsafe, before checking of all the plurality of software programs is completed, wherein the second domain further includes an unsafe software program list that stores identification information of a software program included in the plurality of software programs and determined to be unsafe by the software program checking unit, the first domain is configured to transmit result request information requesting a check result of a software program already checked among the plurality of software programs, the second domain further includes a result notifying unit configured to transmit result response information to the first domain upon receipt of the result request information from the first domain, the result response information including the identification information stored in a safe software program list and the identification information stored in the unsafe software program list, the first domain is configured to execute only a software program determined to be safe by the software program checking unit, on the basis of the result response information received from the result notifying unit, the second domain further includes a request receiver unit configured to receive check request information requesting a check of the software programs, from the first domain, when the result response information notified of from the result notifying unit does not include identification information of a specific software program whose execution is to be now started, the first domain is configured to transmit the check request information requesting a check of the specific software program, to the request receiver unit, when the software program checking unit is checking another software program different from the specific software program when the request receiver unit receives the check request information, the request receiver unit is configured to suspend the checking of the different software program, and the software program checking unit is configured to give priority to the specific software program and to check whether or not the specific software program is safe, and the software program checking unit is configured to resume the checking of the different software program after completing checking of the specific software program.

2. The terminal device according to claim 1, wherein
the execution sequence storage unit is configured to store each of the plurality of software programs in association with any one of first domain identification information that identifies the first domain and second domain identification information that identifies the second domain;
according to the execution priority, the software program checking unit of the second domain is configured to check whether or not each software program stored in association with the second domain identification information is safe; and
the first domain includes a sub software program checking unit configured to check whether or not each software program stored in association with the first domain identification information is safe.

3. The terminal device according to claim 2, wherein
the execution sequence storage unit is configured to store each of the plurality of software programs in association with timing information indicating at least one of timing at startup of the terminal device and timing after completion of startup of the terminal device; and
each of the software program checking unit and the sub software program checking unit is configured to check whether or not the software program is safe, according to the timing indicated by the timing information.

4. The terminal device according to any one of claims 1 to 3, wherein
the safe software program list stores identification information of a software program included in the plurality of software programs and determined to be safe by the software program checking unit; and
the first domain is configured to judge whether or not identification information of a certain software program is stored in the safe software program list, before executing the certain software program, and then restricts execution of the certain software program when the identification information of the certain software program is not stored in the safe software program list.

5. The terminal device according to any one of claims 1 to 3, wherein
the plurality of software programs includes a first software program to be constantly executed by the first domain and a second software program to be executed with predetermined frequency by the first domain;
the execution sequence storage unit is configured to preferentially store the execution priority of the first software program rather than the execution priority of the second software program; and
according to the execution priority, the software program checking unit is configured to preferentially check the first software program rather than the second software program as to whether or not the software program is safe.

6. The terminal device according to claim 5, wherein
the second domain further includes:
an execution frequency acquiring unit configured to acquire execution frequency of the second software program to be executed by the first domain; and
an execution frequency storage unit configured to store the second software program in association with the acquired execution frequency; and
the software program checking unit is configured to check whether or not the second software program is safe, by using, as the execution priority, the execution frequency stored in the execution frequency storage unit.

7. The terminal device according to any one of claims 1 to 3, wherein
the software program checking unit is configured to check whether or not the plurality of software programs are safe, every predetermined period.

8. The terminal device according to claim 1, wherein
when the first domain transmits the check request information, the first domain is configured to suspend execution of the specific software program until the first domain receives an instruction from the execution restricting unit; and
the execution restricting unit is configured to instruct the first domain to execute the specific software program when the software program checking unit determines that the specific software program is safe.

9. The terminal device according to claim 1, wherein
the first domain is configured to start execution of the specific software program when the first domain transmits the check request information to the request receiver unit; and
the execution restricting unit is configured to restrict the first domain from executing the specific software program, when the software program checking unit determines that the specific software program is unsafe.

10. A method for checking a software program in a terminal device including a first domain configured to execute a plurality of software programs and a second domain configured to check whether or not each of the plurality of software programs is safe, the method comprising:
a sequence storing step of storing, at the second domain, execution priority of the plurality of software programs to be executed by the first domain, the execution priority being stored prior to a start up of the terminal device and corresponding to a specified sequence in which a plurality of programs are to be executed in the first domain;
a checking step of checking, at the second domain, whether or not the plurality of software programs are safe after the startup of the terminal device, according to the execution priority, the first domain executing a first program in the specified sequence that has been checked by the second domain while the second domain performs processing for verifying a second program in the specified sequence; and
a restricting step of restricting, at the second domain, the first domain from executing a software program included in the plurality of software programs and having a check result indicating that the software program is unsafe, before checking of all the plurality of software programs is completed,
wherein the second domain further includes an unsafe software program list that stores identification information of a software program included in the plurality of software programs and determined to be unsafe by the checking step,
the first domain is configured to transmit result request information requesting a check result of a software program already checked among the plurality of software programs,
the second domain further includes a result notifying unit configured to transmit result response information to the first domain upon receipt of the result request information from the first domain, the result response information including the identification information stored in a safe software program list and the identification information stored in the unsafe software program list,
the first domain is configured to execute only a software program determined to be safe by the checking step, on the basis of the result response information received from the result notifying unit,
the second domain further includes a request receiver unit configured to receive check request information requesting a check of the software programs, from the first domain,
when the result response information notified of from the result notifying unit does not include identification information of a specific software program whose execution is to be now started, the first domain is configured to transmit the check request information requesting a check of the specific software program, to the request receiver unit,
when the checking step is checking another software program different from the specific software program when the request receiver unit receives the check request information, the request receiver unit is configured to suspend the checking of the different software program, and
the checking step includes giving priority to the specific software program and to check whether or not the specific software program is safe, and the checking step includes resuming the checking of the different software program after completing checking of the specific software program.

11. The terminal device according to claim 1, wherein the first domain and second domain correspond to independent processors on the terminal device.

12. The terminal device according to claim 1, wherein after the startup of the terminal device the software program checking unit starts checking whether or not the plurality of software programs are safe according to the execution priority after an initialization process of an operating system of the second domain has started and before the initialization process has completed.

13. The terminal device according to claim 1, wherein after the startup of the terminal device the software program checking unit starts checking whether or not an operating system of the first domain is safe before checking any other software programs of the first domain.

\* \* \* \* \*